United States Patent [19]
Johnson

[11] Patent Number: 6,133,851
[45] Date of Patent: Oct. 17, 2000

[54] TRUCK LIGHT WARNING SYSTEM

[76] Inventor: Dennis B. Johnson, 4810 Halls Ferry Rd., Vicksburg, Miss. 39180

[21] Appl. No.: 09/399,551

[22] Filed: Sep. 20, 1999

[51] Int. Cl.[7] .................................................. G08G 1/00
[52] U.S. Cl. ......................... 340/901; 340/903; 340/431; 340/435; 340/436
[58] Field of Search .................... 340/901, 903, 340/431, 435, 436, 463, 464, 465, 468, 471, 478

[56] References Cited

U.S. PATENT DOCUMENTS

| | | | |
|---|---|---|---|
| 5,467,072 | 11/1995 | Michael | 340/436 |
| 5,528,217 | 6/1996 | Adams | 340/435 |
| 5,760,708 | 6/1998 | Seith | 340/903 |
| 5,786,772 | 7/1998 | Schofield et al. | 340/903 |

*Primary Examiner*—Daniel J. Wu
*Assistant Examiner*—Sihong Huang

[57] ABSTRACT

A truck light warning system for automatically alerting a driver near a truck that they are either following too closely or within a truck's blind spots. The inventive device includes a rear sensor, a front sensor, a pair of side sensors, an engine control module (ECM), an instrument control panel (ICP), a rear indicator, a front indicator and a pair of side indicators all electrically connected. A plurality of side movement lights are electrically connected to the ECM for informing the driver of a vehicle that they should drive past the side of the tractor and trailer. A plurality of strobe lights may be included that are activated when the fog lights of the tractor are activated for warning drivers during inclimate weather conditions. When a vehicle is in one of the four blind spots surrounding the tractor and trailer, the ECM activates the appropriate indicator to warn the driver that they are in a blind spot or following too closely. The ECM is preferably programmable for allowing the programming of various messages to be displayed upon the indicators.

3 Claims, 6 Drawing Sheets

TRUCK LIGHT WARNING SYSTEM

BACKGROUND OF THE INVENTION

1. Field of the Invention

The present invention relates generally to truck safety devices and more specifically it relates to a truck light warning system for automatically alerting a driver near a truck that they are either following too closely or within a truck's blind spots.

Trucks, such as semi-trucks with an attached trailer, have four main "blind spots": the left side, the right side, the rear and the front. When a vehicle is within one of these blind spots, the driver of the truck is unable to see the vehicle making a potentially hazardous situation for both the truck driver and the vehicle drive. Hence, there is a need for a warning system that automatically warns a driver of a vehicle that they are within one of the four blind spots of the truck thereby encouraging the driver of the vehicle to exit from the blind spot so the truck driver can see them.

2. Description of the Prior Art

Blind spot warning systems for trucks have been in use for years. Typically, the warning systems comprise a plurality of sensors positioned about the truck and the trailer that detects the presence of a vehicle within a blind spot. Upon detecting a vehicle within a blind spot, an engine control module (ECM) transmits a message to the instrument control panel (ICP) within the cab of the truck alerting the driver of the truck that a vehicle is within a blind spot.

Unfortunately, conventional blind spot warning systems do not alert the driver of the vehicle that they are within a blind spot leading them to believe that the truck driver can see the vehicle. The driver of the vehicle with then sometimes remain within the blind spot resulting in a dangerous situation for all individuals involved.

While these devices may be suitable for the particular purpose to which they address, they are not as suitable for automatically alerting a driver near a truck that they are either following too closely or within a truck's blind spots. Conventional blind spot warning systems only alert the truck driver who may not notice that a vehicle is in a blind spot.

In these respects, the truck light warning system according to the present invention substantially departs from the conventional concepts and designs of the prior art, and in so doing provides an apparatus primarily developed for the purpose of automatically alerting a driver near a truck that they are either following too closely or within a truck's blind spots.

SUMMARY OF THE INVENTION

In view of the foregoing disadvantages inherent in the known types of blind spot warning devices now present in the prior art, the present invention provides a new truck light warning system construction wherein the same can be utilized for automatically alerting a driver near a truck that they are either following too closely or within a truck's blind spots.

The general purpose of the present invention, which will be described subsequently in greater detail, is to provide a new truck light warning system that has many of the advantages of the blind spot warning systems mentioned heretofore and many novel features that result in a new truck light warning system which is not anticipated, rendered obvious, suggested, or even implied by any of the prior art blind spot warning systems, either alone or in any combination thereof.

To attain this, the present invention generally comprises a rear sensor, a front sensor, a pair of side sensors, an engine control module (ECM), an instrument control panel (ICP), a rear indicator, a front indicator and a pair of side indicators all electrically connected. A plurality of side movement lights are electrically connected to the ECM for informing the driver of a vehicle that they should drive past the side of the tractor and trailer. A plurality of strobe lights may be included that are activated when the fog lights of the tractor are activated for warning drivers during inclimate weather conditions. When a vehicle is in one of the four blind spots surrounding the tractor and trailer, the ECM activates the appropriate indicator to warn the driver that they are in a blind spot or following too closely. The ECM is preferably programmable for allowing the programming of various messages to be displayed upon the indicators.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a truck light warning system that will overcome the shortcomings of the prior art devices.

Another object is to provide a truck light warning system that visually alerts a driver following to closely or within a blind spot of a truck.

An additional object is to provide a truck light warning system that displays a readable message for the driver to read warning them about the dangerous conditions.

A further object is to provide a truck light warning system that informs the driver of the vehicle on how to get out of the dangerous situation.

Another object is to provide a truck light warning system that can be utilized upon most semi-trucks and trailers.

A further object is to provide a truck light warning system that increases the safety of the truck driver and surrounding drivers.

An additional object is to provide a truck light warning system that utilizes strobe lights for alerting drivers during times of fog or other degraded weather conditions.

Another object is to provide a truck light warning system that is not activated by passing vehicles.

A further object is to provide a truck light warning system that is programmable for allowing the truck driver to change the warning messages displayed to drivers of other vehicles.

An additional object is to provide a truck light warning system that utilizes sensors utilizing laser or microwave technology to detect an adjacent object such as a vehicle.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
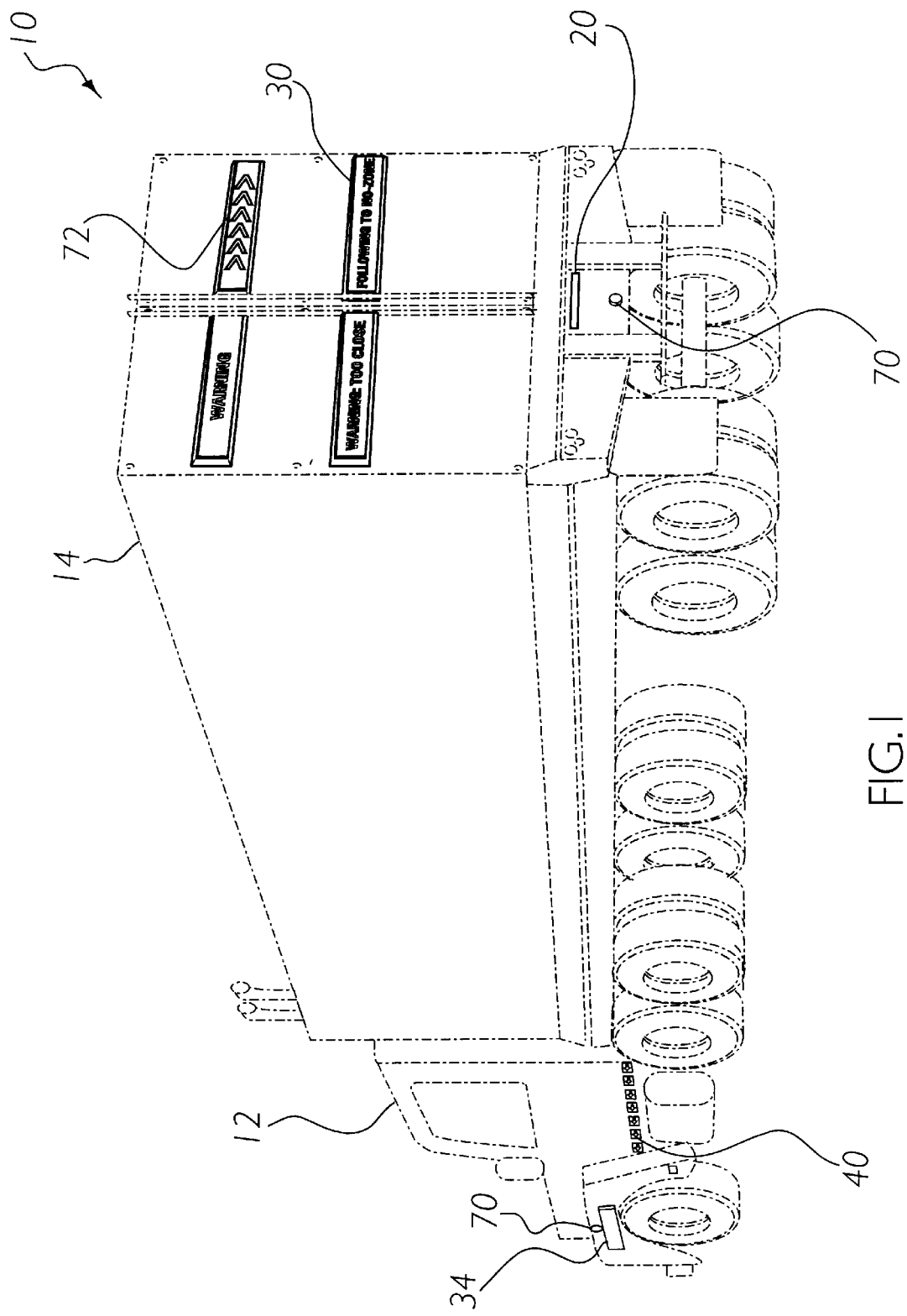
FIG. 1 is an upper perspective view of the present invention attached to a tractor and trailer.

Turning now descriptively to the drawings, in which similar reference characters denote similar elements throughout the several view, FIGS. 1 through 6 illustrate a truck light warning system 10, which comprises a rear sensor 20, a front sensor 22, a pair of side sensors 24, an engine control module (ECM), an instrument control panel (ICP), a rear indicator 30, a front indicator 32 and a pair of side indicators 34 all electrically connected. A plurality of side movement lights 40 are electrically connected to the ECM for informing the driver of a vehicle that they should drive past the side of the tractor 12 and trailer 14. A plurality of strobe lights 70 may be included that are activated when the fog lights of the tractor 12 are activated for warning drivers during inclimate weather conditions. When a vehicle is in one of the four blind spots surrounding the tractor 12 and trailer 14, the ECM activates the appropriate indicator 30, 32, 34 to warn the driver that they are in a blind spot or following too closely. The ECM is preferably programmable for allowing the programming of various messages to be displayed upon the indicators 30, 32, 34.

As shown in FIG. 1 of the drawings, a tractor 12 has a rear portion that is engageable with a trailer 14 for transporting goods and other material. The tractor 12 and the trailer 14 have four main blind spots that make it difficult for the driver of the tractor 12 to visually locate adjacent vehicles: the front, the rear, the left side and the right side.

Figure 2:
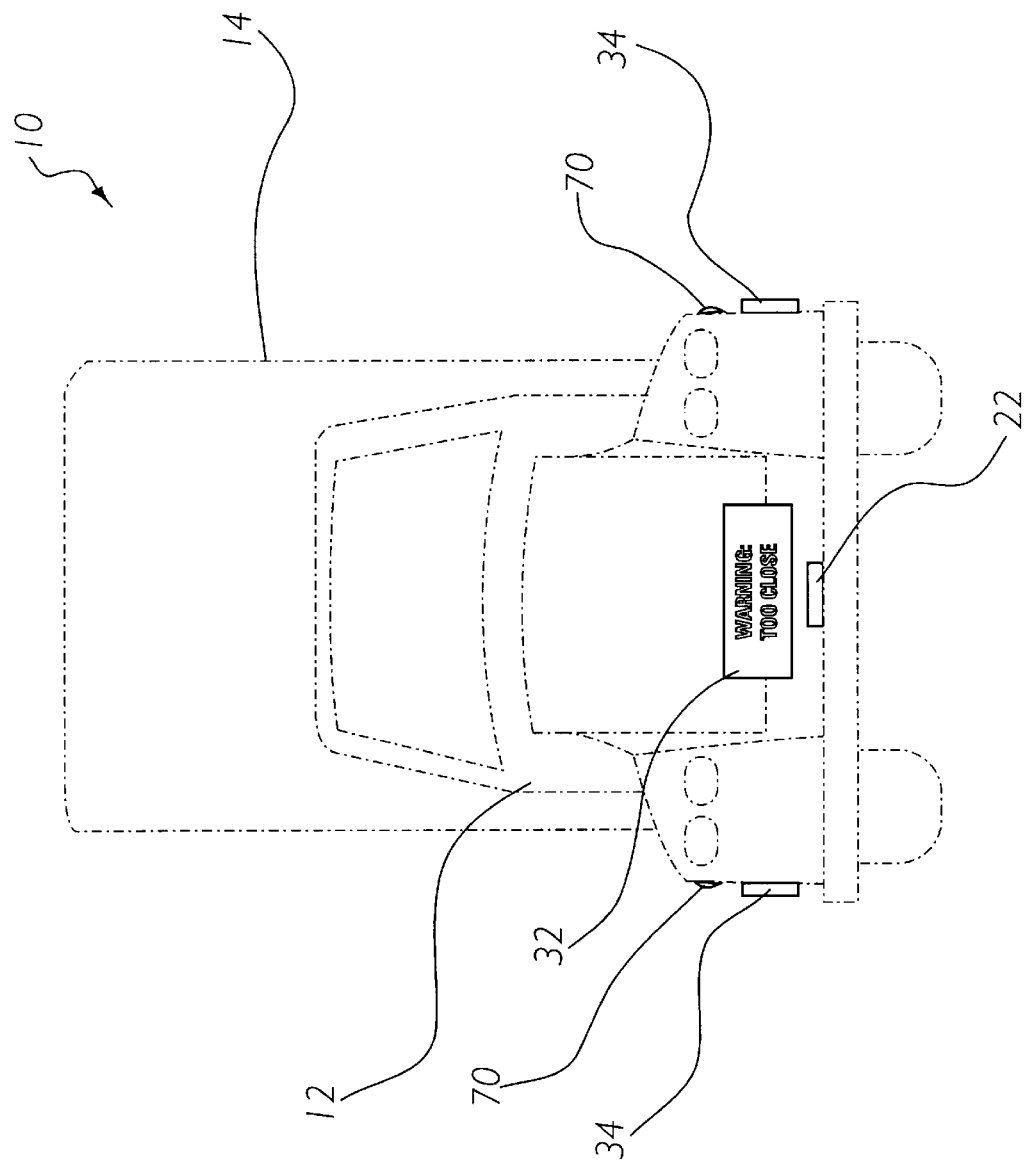
FIG. 2 is a front view of the present invention attached to the tractor.
Figure 6:
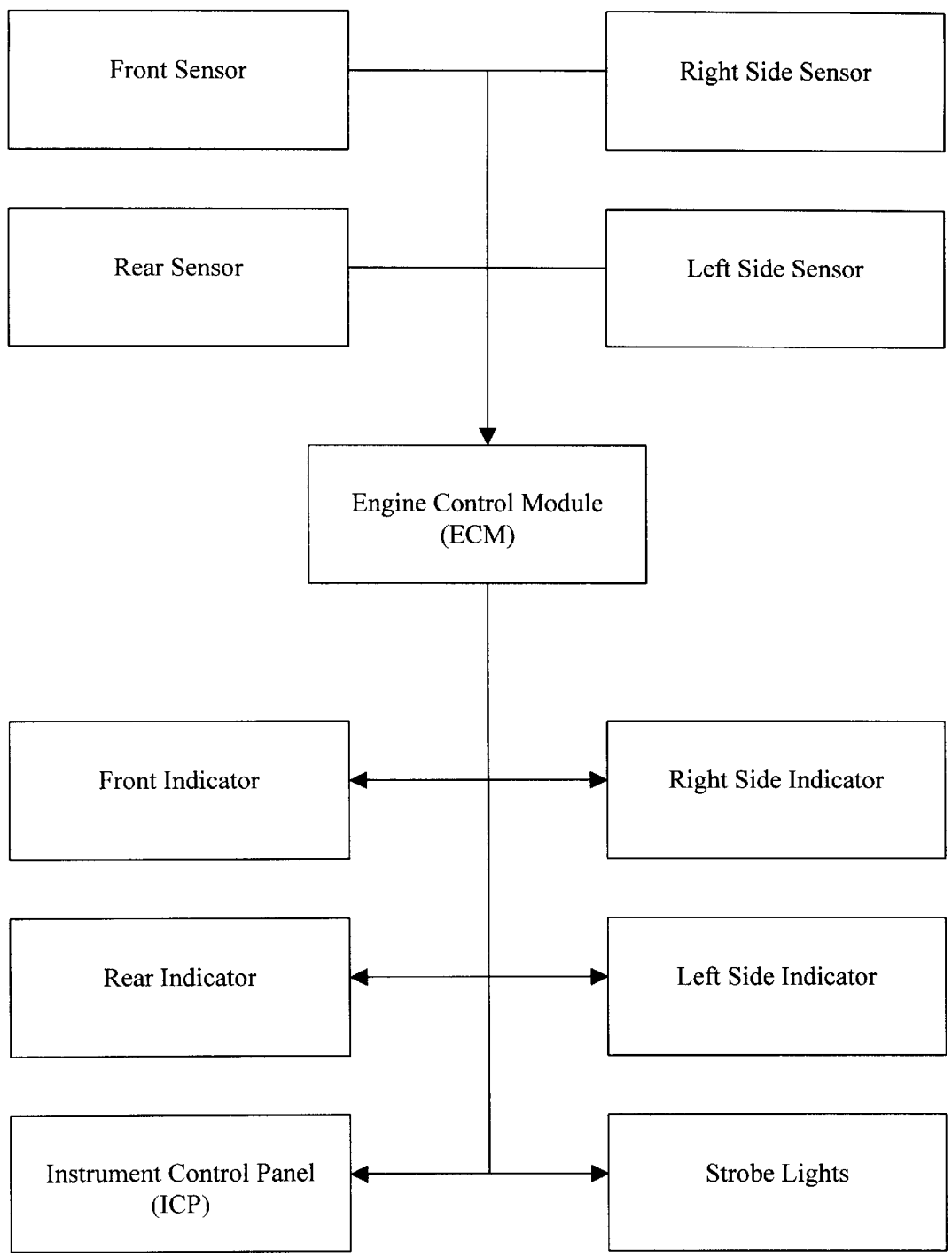
FIG. 6 is a box diagram illustrating the conventional electronic circuitry required to operate the present invention.

As shown in FIG. 2 of the drawings, a front sensor 22 is secured to the front end of the tractor 12 for detecting vehicles within the front blind zone. A front indicator 32 is attached to the front of the tractor 12 also in a location visible to a driver of a vehicle. The front indicator 32 and the front sensor 22 are electrically connected to the engine control module (ECM) as shown in FIG. 6 of the drawings.

When the front sensor 22 detects a vehicle in the front blind zone, the ECM transmits an electronic message to be displayed upon the front indicator 32. The electronic message is changeable by the driver utilizing conventional keyboard entry techniques. A message is also simultaneously transmitted to the instrument control panel (ICP) for the tractor 12 driver to view so they know that a vehicle is in a blind zone about their tractor 12.

Figure 3:
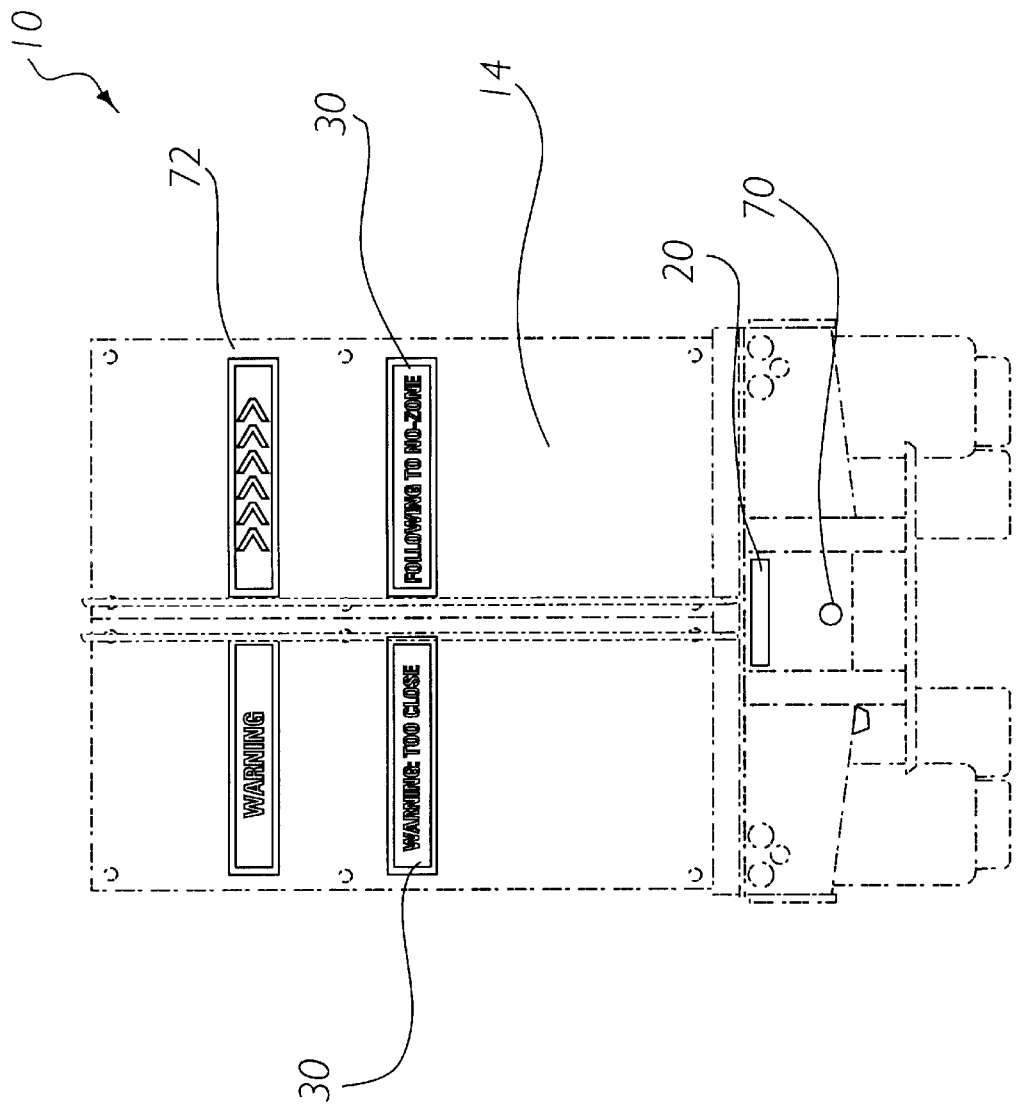
FIG. 3 is a rear view of the present invention attached to a trailer.

As shown in FIG. 3 of the drawings, a rear sensor 20 is secured to the rear end of the trailer 14 for detecting vehicles within the rear blind zone. A rear indicator 30 is attached to the rear of the trailer 14 also in a location visible to a driver of a vehicle behind the trailer 14 and tractor 12. The rear indicator 30 and the rear sensor 20 are electrically connected to the engine control module (ECM) as shown in FIG. 6 of the drawings.

When the rear sensor 20 detects a vehicle in the rear blind zone, the ECM transmits an electronic message to be displayed upon the rear indicator 30. The electronic message is changeable by the driver utilizing conventional keyboard entry techniques. A message is also simultaneously transmitted to the instrument control panel (ICP) for the tractor 12 driver to view so they know that a vehicle is in a blind zone about their tractor 12.

Figure 4:
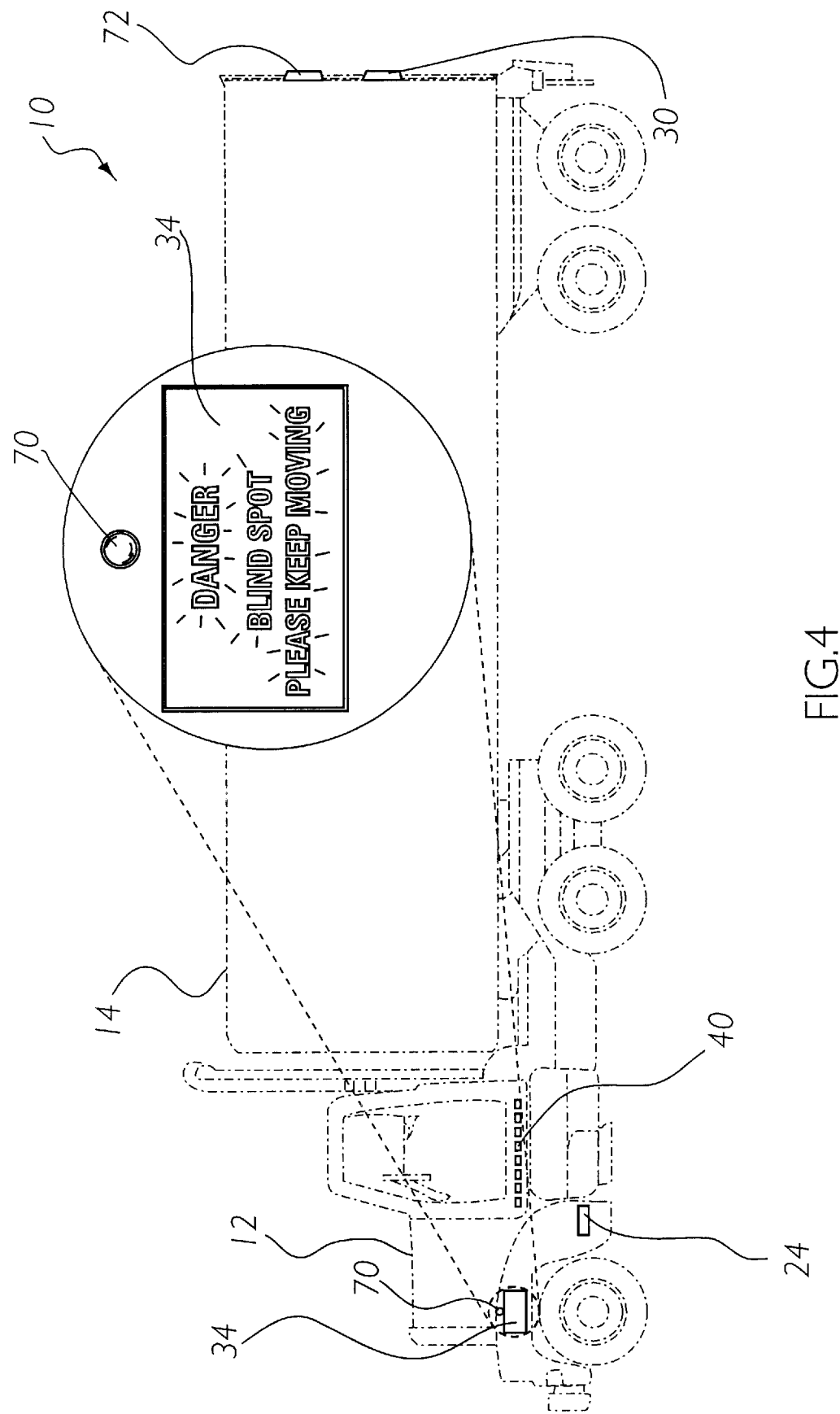
FIG. 4 is a side view of the present invention attached to the tractor and trailer.
Figure 5:
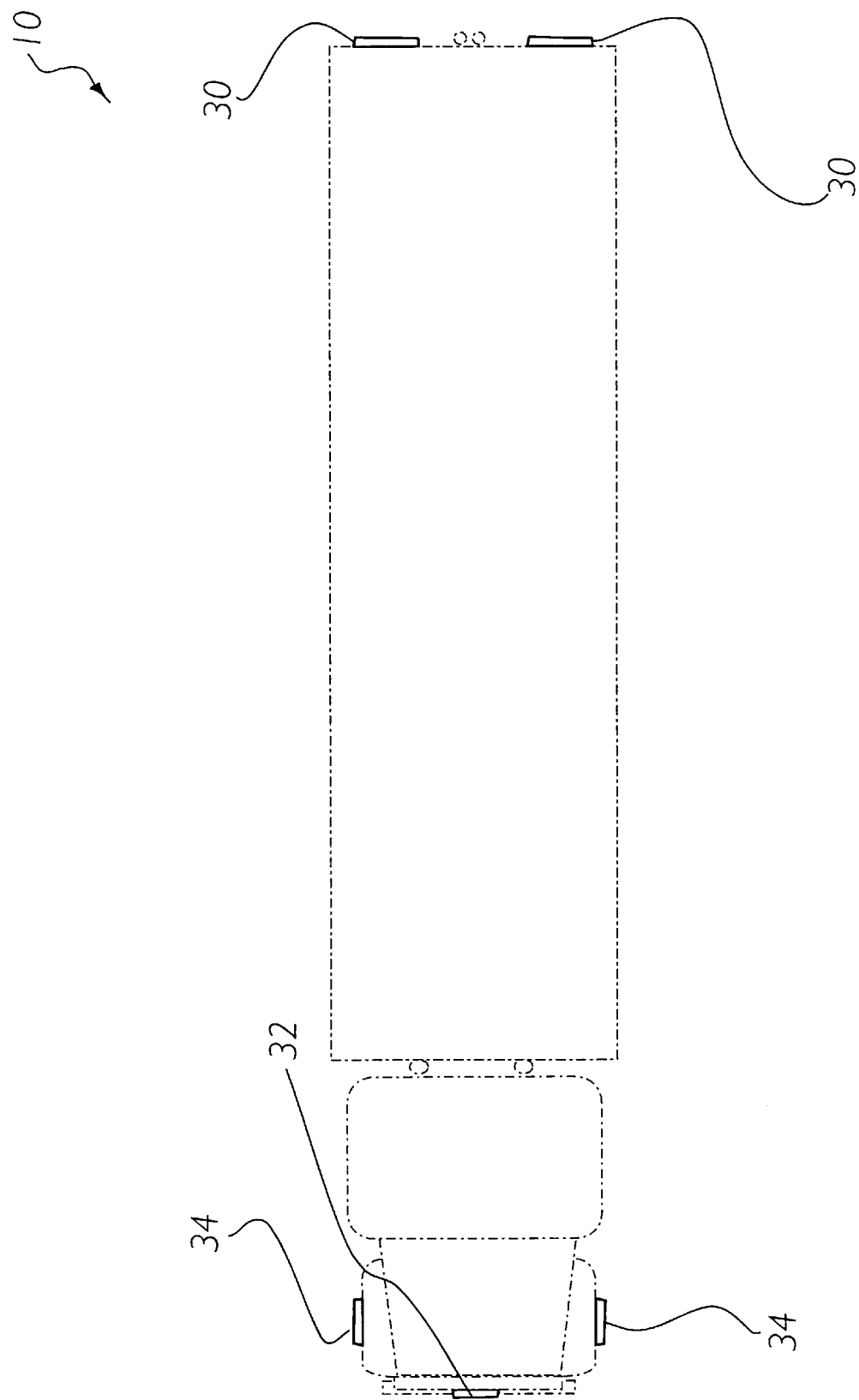
FIG. 5 is a top view of the present invention attached to the tractor and trailer.

As further shown in FIG. 3 of the drawings, a turn indicator 72 is electrically connected to the turn system of the tractor 12 thereby indicating when the driver of the truck is going to turn right thereby informing surrounding vehicles to maintain a safe distance from the tractor 12. As shown in FIGS. 1, 3 and 4 of the drawings, a plurality of strobe lights 70 are secured about the tractor 12 and the trailer 14. The strobe lights 70 may utilize any well-known bulb such as fluorescent bulbs. The strobe lights 70 are bright enough for a driver to see during inclimate weather yet are not too bright in the respect that they could blind the driver. The strobe lights 70 are secured to the rear of the trailer 14 and to the sides of the tractor 12. The strobe lights 70 are electrically connected to the ECM as shown in FIG. 6 of the drawings. The strobe lights 70 are also electrically connected to the fog light system of the tractor 12 so that when the fog lights of the tractor 12 are activated the strobe lights 70 are simultaneously activated with the indictors 30, 32, 34.

As shown in FIG. 4 of the drawings, a pair of side sensors 24 are secured to the opposing sides of the tractor 12 for detecting vehicles within the left and right side blind zones. A pair of side indicators 34 are also attached to the sides of the tractor 12 in a location visible to a driver of a vehicle. The side indicators 34 and the side sensors 24 are electrically connected to the engine control module (ECM) as shown in FIG. 6 of the drawings.

When the side sensors 24 detects a vehicle in the side blind zones, the ECM transmits an electronic message to be displayed upon one of the side indicators 34. The electronic message is changeable by the driver utilizing conventional keyboard entry techniques. A message is also simultaneously transmitted to the instrument control panel (ICP) for the tractor 12 driver to view so they know that a vehicle is in a blind zone about their tractor 12.

As further shown in FIGS. 1 and 4 of the drawings, a plurality of side movement lights 40 are provided that are electrically connected to the ECM. When one of the side sensors 24 detects a vehicle to the side of the tractor 12 and trailer 14, the ECM activates the side movement lights 40 sequentially in a forward motion indicating to the driver of the vehicle to drive past the tractor 12 since they are in a blind spot.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A truck light warning system, comprising:

a central control unit;

at least one sensor electrically connected to said central control unit, wherein said at least one sensor is attachable to a tractor and trailer for detecting the presence of another vehicle;

at least one display electrically connected to said central control unit for displaying a warning message to said vehicle when said at least one sensor detects said vehicle;

a plurality of side movement lights electrically connected to said central control unit and attachable to a side of said tractor;

wherein said plurality of side movement lights operate in sequence indicating a forward motion;

a turn indicator attached to a rear portion of said trailer and electrically connected to said central control unit;

wherein said at least one display comprises:

a rear display attachable to said rear portion of said trailer and electrically connected to said central control unit for displaying said warning message;

a front display attachable to a front portion of said tractor and electrically connected to said central control unit for displaying said warning message;

a pair of side displays attachable to opposing sides of said tractor and electrically connected to said central control unit for displaying said warning message.

2. The truck light warning system of claim 1, including at least one strobe light attachable to said trailer.

3. The truck light warning system of claim 2, wherein said at least one strobe light is electronically activated when fog lights of said tractor are activated.

* * * * *